July 1, 1969  S. E. JOHNSON  3,452,552

CONTROL OF ABSORPTION REFRIGERATION SYSTEMS

Filed Nov. 20, 1967

INVENTOR.
STUART E. JOHNSON.
BY
Frank N. Decker Jr.
ATTORNEY

United States Patent Office 3,452,552
Patented July 1, 1969

3,452,552
CONTROL OF ABSORPTION REFRIGERATION SYSTEMS
Stuart E. Johnson, Syracuse, N.Y., assignor to Carrier Corporation, Syracuse, N.Y., a corporation of Delaware
Filed Nov. 20, 1967, Ser. No. 684,316
Int. Cl. F25b 15/00, 41/00
U.S. Cl. 62—141                                      9 Claims

ABSTRACT OF THE DISCLOSURE

An absorption refrigeration system having a dilution control for passing liquid refrigerant from the evaporator sump into a weak absorbent solution passage under conditions of low entering cooling medium temperature to the absorber. The dilution control is arranged to automatically open a dilution line upon the occurrence of either a refrigerant level in an evaporator sump above a first level and a cooling medium temperature below a predetermined temperature, or a refrigerant level in excess of a second higher predetermined level in the refrigerant sump.

BACKGROUND OF THE INVENTION

This invention relates to an absorption refrigeration system having an evaporator for evaporating refrigerant to produce cooling, an absorber including an absorber heat exchanger for cooling absorbent solution to promote absorption of refrigerant vapor therein, a generator, for heating absorbent solution to concentrate it by vaporizing refrigerant therefrom and a condenser for condensing refrigerant vapor formed in the generator. A cooling medium, such as water, is passed through the absorber heat exchanger and a similar heat exchanger in the condenser for carrying away the heat rejected from the refrigeration system. The cooling medium is usually passed to a cooling tower or other location where it is evaporatively cooled and returned to absorb more heat from the refrigeration system.

It is well known that when the temperature of the cooling medium is excessively low, the absorption refrigeration system may malfunction due to crystallization of the absorbent on the absorber heat exchanger. Consequently, it is frequent practice to provide a cooling tower bypass line and a temperature responsive cooling tower bypass valve together with associated control mechanism for bypassing sufficient cooling medium around the cooling tower to maintain a minimum cooling medium temperature to the system. When the predetermined cooling medium temperature is reached, the bypass begins to close and the temperature of the cooling medium is maintained by the cooling tower bypass valve at the desired minimum temperature level for safe operation of the system.

However, during the start-up of an absorption refrigation system with a cooling tower bypass valve, there is a first period of time during which the cooling medium temperature is gradually increasing before finally reaching the desired minimum temperature for safe operation and crystallization of absorbent salt can occur in the absorber during this period of time.

Absorption refrigeration systems are frequently diluted by means of dilution when the system is prepared for shutdown. Consequently, during the start-up of an absorption refrigeration system, there is a period of time during which the concentration of the absorbent solution is gradually increasing before finally reaching the desired concentration for normal operation. When an absorption refrigeration system is started up, the cooling medium gradually increases towards the desired minimum temperature for safe operation, while simultaneously the absorbent solution gradually increases the concentration towards the desired concentration for normal operation. Crystallization of absorbent solution will not occur provided the concentration of absorbent solution does not increase too rapidly with respect to the rate of increase in the temperature of the cooling medium.

Accordingly, it is a principal feature of this invention to provide an absorption refrigeration system with suitable control means for reducing the rate at which the absorbent concentration increases at start-up to permit start-up and safe operation with relatively low cooling medium temperatures.

SUMMARY OF THE INVENTION

In accordance with this invention, there is provided an absorption refrigeration system having a dilution passage and dilution valve arrangement for passing liquid refrigerant into the absorbent solution circuit upon opening of the dilution valve. A temperature sensor is suitably located for sensing an absorber cooling medium temperature below a predetermined temperature at which the absorption refrigeration system is unable to safely operate at normal absorbent solution concentration. During operation of the system, if the sensed cooling medium temperature is below the predetermined temperature, the dilution valve is opened to dilute the absorbent solution in the system with liquid refrigerant so as to operate at lower than normal concentration. With average concentration of solution in the absorber at the lower concentration level, the temperature at which solidification occurs is greatly reduced, so that the refrigeration system is enabled to continue operation at lower cooling medium temperatures than would otherwise be possible.

The dilution of absorbent solution with refrigerant results in lower efficiency of operation of the system, but the lowered efficiency is somewhat offset by the gain in efficiency due to the lower temperature to which the system rejects heat. However, the arrangement provides the important advantage of providing refrigeration under conditions where it would be otherwise difficult or impossible to operate the system. Specifically start-up of the system under low cooling medium temperature conditions is facilitated by the invention.

DESCRIPTION OF THE PREFERRED EMBODIMENT

Figure 1:
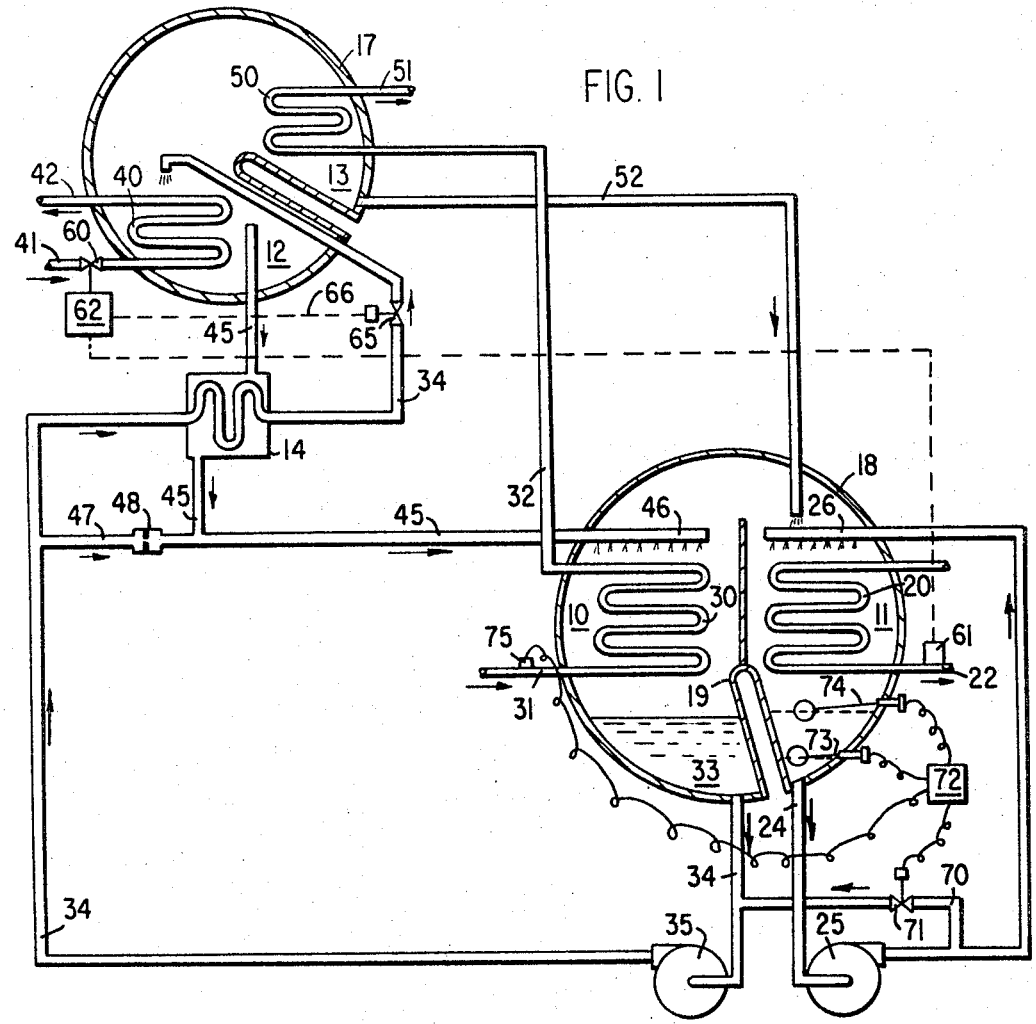
FIGURE 1 illustrates a schematic flow diagram, partly in cross section, of an absorption refrigeration system embodying a dilution control system in accordance with this invention.

Referring to FIGURE 1, there is shown an absorption refrigeration system comprising an absorber 10, a refrigerant evaporator 11, a generator 12, a refrigerant condenser 13, and a solution heat exchanger 14 arranged in a refrigeration circuit. Absorber 10 and refrigerant evaporator 11 are preferably disposed side by side in a common shell 18 and are separated by a partition 19. Similarly, generator 12 and condenser 13 may be disposed in a common shell 17.

A suitable refrigerant for the system described is water and a suitable absorbent solution is a hygroscopic, aqueous solution of lithium bromide. As used herein, the term "strong" solution describes a concentrated solution of absorbent which is strong in absorbing power, and the term "weak" solution is used to describe a dilute solution of absorbent which is weak in absorbing power.

Evaporator 11 comprises an evaporator heat exchanger 20 for the circulation therethrough of a fluid medium, such as water, being cooled by heat exchange relation with evaporating refrigerant. The fluid is chilled by passage through heat exchanger 20 and is circulated through outlet passage 22 to a suitable remote heat exchanger (not shown) where it absorbs heat from a refrigeration load. The fluid medium is then returned to the evaporator through inlet line 21 for re-cooling. The lower portion of the evaporator between shell 18 and partition 19 forms a refrigerant sump 23 for the accumulation of unevaporated refrigerant. Refrigerant recirculation passage 24 and an electric motor driven refrigerant pump 25 convey refrigerant to spray headers 26, which discharge liquid refrigerant over evaporator heat exchanger 20 to absorb heat from the fluid being cooled.

Absorber 10 comprises an absorber heat exchanger 30 having an inlet passage 31 and an outlet passage 32 for passing a cooling medium in heat exchange relation with absorbent solution to cool the absorbent solution and to promote absorption of refrigerant vapor into the solution. The cooling medium is preferably water, which has been cooled by evaporation in a cooling tower having a temperature responsive cooling tower bypass arrangement (not shown). The lower portion of absorber 10 between partition 19 and shell 18 comprises an absorber sump 33 for the accumulation of absorbent solution. Solution from absorber sump 33 passes through weak solution passage 34 and is pumped by an electric motor driven weak solution pump 35 through the interior passage of solution heat exchanger 14 to generator 12 for concentration therein.

Generator 12 comprises a generator heat exchanger 40 having an inlet passage 41 and an outlet passage 42 for passing a heating medium in heat exchange relation with absorbent solution in the generator. In the embodiment illustrated, the heating medium is preferably steam, although it will be appreciated that other media, such as hot water or combustion gas from a gas burner, may be employed. The absorbent solution in the generator is concentrated by boiling the vaporized refrigerant from the weak solution, thereby forming a strong absorbent solution. The strong absorbent solution is discharged from the generator through strong solution passage 45. For illustration, the strong solution passage has been shown to extend a substantial height above the bottom of shell 17 to maintain a level of solution in the generator, although other weir arrangements to achieve the same result may be employed.

The hot strong solution from generator 12 passes via strong solution passage 45 through the exterior passage of solution heat exchanger 14 and is discharged through absorber spray header 46 over absorber heat exchanger 30. The strong solution preheats the weak solution in heat exchanger 14 to reduce the heat input required in the generator, thereby cooling the strong solution. The cooling strong solution is then further cooled in absorber 10 by heat exchange with the cooling medium passing through absorber heat exchanger 30 to promote the absorption of refrigerant vapor into the strong solution.

A weak solution bleed passage 47 having a suitable restriction 48 therein is disposed to bleed a small quantity of weak solution from weak solution passage 34 into strong solution passage 45 to increase the quantity of solution passing through spray headers 46 sufficiently to obtain complete wetting of absorber heat exchanger 30 under full load operating conditions.

Condenser 13 comprises a condenser heat exchanger 50 having an inlet connected to outlet passage 32 from absorber heat exchanger 30, and having an outlet 51 for the passage of cooling medium through the condenser heat exchanger. The cooling medium, preferably water, is passed from absorber heat exchanger 30 through condenser heat exchanger 50, through passage 51, to a cooling tower and temperature responsive cooling tower bypass arrangement (not shown), where it is cooled and returned via passage 31. Refrigerant vapor separated from absorbent solution in generator 12 passes into condenser 13 in heat exchange relation with the cooling medium, thereby condensing the refrigerant vapor. The condensed refrigerant passes through refrigerant liquid passage 52 into sump 23 of evaporator 11 and is sprayed over evaporator heat exchanger 20 to cool the refrigeration load.

A heating medium control valve 60 is disposed in inlet line 41 to generator heat exchanger 40 and arranged to control the passage of heating medium to the generator. A temperature sensor 61 is secured at a suitable location, such as line 22, to provide a control signal which is a function of the refrigeration demand imposed on the system. It will be appreciated that the temperature of chilled water leaving evaporator 11 through line 22 or the temperature within the evaporator is a function of the heat being absorbed from the refrigeration load. Thus, temperature sensor 61 is responsive to the demand imposed on the system. Sensor 61 provides an electrical, pneumatic or mechanical control signal to operate a suitable control circuit 62, such as a control relay for positioning heating medium valve 60. In the case of a pneumatic control system, control circuit 62 may comprise a pneumatic relay of conventional design.

A solution control valve 65 is preferably disposed in weak solution line 34 between the outlet of heat exchanger 14 and generator 12. Solution valve 65 is connected by a control line 66 to a suitable control signal source, such as control relay 62, to position the solution valve in accordance with the refrigeration demand imposed on the system. For example, in a pneumatic system, line 66 may be a pneumatic line which senses the control signal pressure provided to valve 60, which is derived from temperature sensor 61. Valve 65 is arranged to reduce the solution flow to the generator when the signal to heating medium valve 60 is reduced below a predetermined level indicative of a light refrigeration load on the system.

In accordance with this invention, a dilution passage 70 having a dilution valve 71 therein extends between the discharge of refrigerant pump 25 and the inlet of weak solution pump 35. When dilution passage 70 is opened, liquid refrigerant from refrigerant sump 23 passes through the dilution line into weak solution line 34 to lower the average concentration of absorbent solution in the system. A dilution control circuit 72 is provided to control the operation of the dilution valve 71.

Dilution control circuit 72 is responsive to the refrigerant level in refrigerant sump 23 sensed by a first level responsive float control switch 73, a second level responsive float control switch 74 and a cooling medium temperature responsive switch 75.

First level responsive control switch 73 is disposed in refrigerant sump 23 and senses the existence of a refrigerant level in sump 23 above a first predetermined level. Second level responsive float control switch 74 is also disposed in refrigerant sump 23 and senses the existence of a refrigerant level therein above a second predetermined level, higher than the first level. While separate float controlled electrical switches have been illustrated, it will be appreciated that either separate or combined electrical, pneumatic or mechanical level responsive control means may be employed. Temperature responsive switch 75 is preferably disposed on cooling medium inlet passage 31 to sense the temperature of cooling medium supplied to the absorber heat exchanger 30. However, temperature sensor 75 may comprise a pressure transducer in absorber 10 or any temperature or pressure switch suitably arranged anywhere in the cooling medium circuit or elsewhere so as to provide an indication, functionally related to the cooling medium temperature, to provide an indication that the cooling medium temperature is below a predetermined temperature at which solidification of absorbent solution may occur in the absorber at normal operating concentrations.

Figure 2:
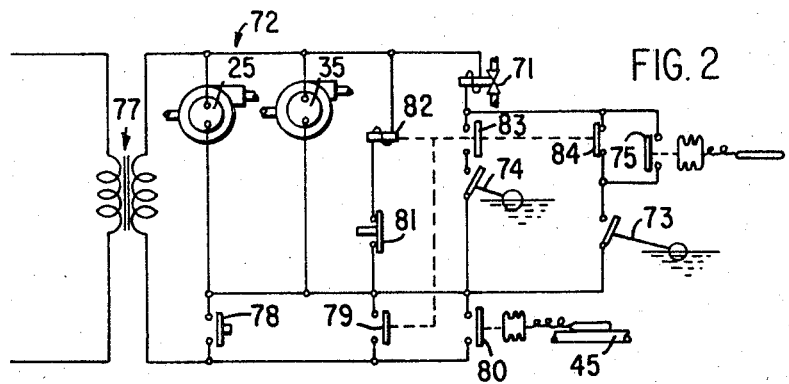
FIGURE 2 schematically illustrates an electrical control diagram for providing control of the dilution system.

Referring particularly to FIGURE 2, there is shown a schematic electrical diagram of a suitable dilution control circuit in accordance with this invention. A transformer 77 supplies electric current to operate the various controls in the solution control circuit. A normally open momentary contact switch 78, the normally open contacts 79 of a control relay 82, and the normally open contacts of a strong solution temperature responsive switch 80 are disposed in parallel with each other. Switch 80 comprises a suitable temperature bulb or other sensor, which is preferably disposed on strong solution line 45 and remains closed whenever the temperature of the strong solution from generator 12 exceeds a predetermined temperature.

A group of circuits, including refrigerant pump motor 25 and weak solution pump motor 35, are disposed in parallel with each other and in series with the first described parallel circuit. The pump motors have been given the same reference character and schematic symbols as the corresponding pumps illustrated in FIGURE 1, although it will be appreciated in practice only pump start relays or other means for energizing the pump motors may be actually in the control circuit.

Normally closed momentary stop switch 81 is connected in series with the solenoid of control relay 82 and the series circuit is connected in parallel with the pump motor relays. Second level responsive float control switch 74 is connected in series with normally open contacts 83 of control relay 82. This circuit is in turn connected in series with the solenoid actuator of dilution valve 71 and the series circuit is connected in parallel with the pump motors. The contacts of first level responsive float switch 73 and normally closed contacts 84 of control relay 82 are connected in series with each other as well as with the solenoid actuator of dilution valve 71. The normally open contacts of temperature responsive switch 75 are connected in parallel with contacts 84 of control relay 82.

When it is desired to start the refrigeration system, start switch 78 is depressed which completes a circuit through pump motors 25 and 35 or their associated relays, as well as through control relay solenoid 82. When the control relay is energized, contacts 79 close to maintain the relay energized, contacts 83 close and contacts 84 open. Since energization of the control relay closes contacts 79, the momentary start switch may be opened without de-energizing the control system. Energization of pump motors or relays 25 and 35 energize the pump motors to circulate refrigerant and absorbent solution in the refrigeration system.

During normal operation, contacts 84 and 75 are open so dilution valve 71 cannot be energized even though switch 73 may be closed. Contacts 83 are closed, but second level responsive float control switch 74 is open, because the level of refrigerant in sump 23 is below the predetermined second level which closes switch 74, so dilution valve 71 is in its deenergized or fully restricted condition. In the event that refrigerant sump 23 rises above the relatively high second predetermined level float switch 74 will close, thereby energizing dilution valve 71 and dilute the absorbent solution to prevent over-concentration thereof.

When refrigeration is no longer desired from the system, the main control circuit 72 will cause heating medium valve 60 to close. Termination of operation of the system may be effected by momentarily opening stop switch 81 and thereby de-energizing control relay 82. However, pumps 25 and 35 continue to run as long as temperature responsive switch 80 is closed, due to the temperature of the strong solution sensed by switch 80. At the same time, de-energization of control relay 82 closes contacts 84 and opens contacts 83. Since the normal operating refrigerant level is above the first predetermined relatively low level sensed by level responsive float switch 73, this switch is closed, resulting in immediate energization of dilution valve 71 to an open or unrestricted condition. The absorbent solution will therefore be diluted by mixing with refrigerant until the level of liquid refrigerant in refrigerant sump 23 drops below the first predetermined level, which causes switch 73 to open. Thereafter, the pumps will continue to run until the temperature of the strong solution leaving generator 12 drops below the temperature predetermined by switch 80, at which time switch 80 will open to de-energize pumps 25 and 35.

In accordance with this invetion, during normal operation of the absorption refrigeration system at relatively high cooling medium temperatures, the contacts of dilution switch 75 remain open. In the event, however, that switch 75 senses a relatively low predetermined cooling medium temperature, its contacts will close. Closing of contacts of switch 75 will energize and open dilution valve 71 until the refrigerant level in sump 23 drops below the first predetermined low level at which switch 73 opens. Consequently, liquid refrigerant will pass from the refrigeration sump 23 through refrigerant pump 25, dilution line 70 and dilution valve 71 into weak solution line 34, where it mixes with absorbent solution. The mixing of liquid refrigerant and absorbent solution will cause a lower average concentration of absorbent solution in the solution circuits including the generator and the absorber, which in turn will reduce the likelihood of crystallization of absorbent solution under conditions of low cooling medium temperature.

If, during operation of the absorption refrigeration system, the cooling medium temperature rises above the predetermined temperature at which the temperature responsive switch 75 opens, dilution valve 71 will be de-energized until the level of refrigerant in sump 23 rises above the second predetermined level at which the switch 74 closes.

The concentration of absorbent solution in the refrigeration system is consequently reduced under conditions of low cooling medium temperature, such as may occur upon start-up of the system, but the system is restored to a higher average concentration automatically when the cooling medium temperature rises to a higher temperature. It will be seen that the level of liquid refrigerant in refrigerant sump 23 is capable of controlling the average concentration of absorbent solution in the system. The system operates at a first low refrigerant level or low concentration condition on shutdown and during periods of low cooling medium temperature and operates at a second high refrigerant level and high concentration condition during normal operation.

For purposes of illustration, a preferred embodiment of the invention has been described, but it will be appreciated that the invention can otherwise be embodied within the scope of the claims.

I claim:
1. An absorption refrigeration system comprising:
(A) an evaporator including an evaporator heat exchanger for evaporating refrigerant in heat exchange relation with a fluid medium being cooled;
(B) an absorber including an absorber heat exchanger for passing absorbent solution in heat exchange relation with a cooling medium to promote absorption of the refrigerant vapor into the cooled absorbent solution in the absorber;
(C) a generator including a generator heat exchanger for passing heating medium in heat exchange relation with absorbent solution to concentrate the solution by vaporizing refrigerant therefrom;
(D) a condenser including a condenser heat exchanger for passing a cooling medium in heat exchange relation with refrigerant vaporized in the generator to condense the refrigerant;
wherein the improvement comprises:
(E) a refrigerant dilution passage including dilution valve means for passing liquid refrigerant to a location in said system for mixing with absorbent solu- tion in the system, to dilute the absorbent solution upon opening of said dilution valve;

(F) temperature responsive means for sensing a temperature functionally related to the temperature of the cooling medium supplied to said absorber heat exchanger; and (G) dilution control circuit means for opening said dilution valve and dilution passage during operation of the refrigeration system upon sensing by said temperature responsive means of a cooling medium temperature below a predetermined temperature thereof, so as to operate said system at a lower average absorbent solution concentration under conditions of cooling medium temperature below said predetermined temperature than when said system is operating with a cooling medium temperature above said predetermined temperature.

2. An absorption refrigeration system as defined in claim 1 including:

(A) a refrigerant sump for storing liquid refrigerant;

(B) a level responsive control means for sensing a refrigerant liquid level in said refrigerant sump in excess of a first predetermined level thereof; and (C) said dilution circuit including means for opening said dilution valve upon the simultaneous occurrence of a second cooling medium temperature below said predetermined temperature and a sensed refrigerant liquid level in said refrigerant sump above said first predetermined level.

3. An absorption refrigeration system as defined in claim 1 including:

(A) a refrigerant sump for storing liquid refrigerant;

(B) level responsive control means for sensing a refrigerant liquid level in said refrigerant sump in excess of a first predetermined level thereof;

(C) said dilution circuit including means for opening said dilution valve upon the simultaneous occurrence of a sensed cooling temperature below said predetermined temperature and a sensed refrigerant liquid level in said refrigerant sump above said first predetermined level;

(D) level responsive control means for sensing a refrigerant liquid level in said refrigerant sump above a second level thereof, said second refrigerant liquid level being higher than said first refrigerant liquid level; and (E) said dilution circuit further including means for opening said dilution valve during operation of said refrigeration system upon the occurrence of a refrigerant level in said refrigerant sump in excess of said second level.

4. An absorption refrigeration system as defined in claim 1 including:

(A) a refrigerant sump for storing liquid refrigerant;

(B) a weak solution pump for passing weak absorbent solution from the absorber to the generator for concentration therein;

(C) a refrigerant pump for passing liquid refrigerant from said refrigerant sump over said evaporator heat exchanger for heat exchange with a fluid to be cooled; and (D) said refrigerant dilution passage comprising a liquid passage disposed to pass liquid refrigerant from the discharge of said refrigerant pump to the inlet of said weak solution pump.

5. An absorption refrigeration system as defined in claim 1 including:

(A) a refrigerant sump for storing liquid refrigerant;

(B) a weak solution pump for passing weak absorbent solution from the absorber to the generator for concentration therein;

(C) a refrigerant pump for passing liquid refrigerant from said refrigerant sump over said evaporator heat exchanger for heat exchange with a fluid to be cooled;

(D) said refrigerant dilution passage comprising a liquid passage disposed to pass liquid refrigerant from the discharge of said refrigerant pump to the inlet of said weak solution pump;

(E) a heating medium supply valve for terminating the supply of heating medium to the generator when desired;

(F) control circuit means for energizing and de-energizing said refrigerant pump and said weak solution pump, said circuit means including means for operating said pumps after termination of the supply of heating medium to the generator, said circuit means being responsive to a temperature functionally related to the temperature of absorbent solution in said generator;

(G) level responsive means for sensing a refrigerant level in said refrigerant sump in excess of a first predetermined level;

(H) level responsive means for sensing a refrigerant level in said refrigerant sump in excess of a second level, said second level being higher than said first level; and (I) said dilution control circuit being arranged to open said dilution valve during operation of said system upon the occurrence of a sensed refrigerant liquid level in said refrigerant sump in excess of said second level, or the simultaneous occurrence of a sensed refrigerant liquid level in said refrigerant sump above said first level and a sensed cooling medium temperature below said predetermined temperature, and said dilution control circuit being further arranged to open said dilution line upon termination of the supply of heating medium to the generator when the refrigerant liquid level in said refrigerant sump is above said first level while the temperature of adsorbent solution in said generator is above a predetermined temperature.

6. An absorption refrigeration system as defined in claim 1 including a refrigerant sump for storing liquid refrigerant; level responsive sensing means comprising a float operated switch for sensing a refrigerant liquid level in said sump above a predetermined level; said dilution valve comprising a solenoid actuated valve having a solenoid in series with said float actuated switch and a source of electric current, and said temperature responsive means comprises a temperature responsive switch disposed in series with the solenoid of said dilution valve and a source of electric current.

7. A method of producing refrigeration from an absorption refrigeration system having an evaporator for cooling a fluid medium by evaporating refrigerant, an absorber for absorbing refrigerant evaporated in the evaporator into an absorbent solution, a generator for concentrating absorbent solution by heating absorbent solution and vaporizing refrigerant therefrom, and a condenser for condensing refrigerant vaporized in the generator; which comprises the steps of passing absorbent solution from the generator to the absorber for heat exchange with a cooling medium in the absorber, thereby cooling said absorbent solution and promoting absorption of refrigerant vapor therein; passing absorbent solution from the absorber to the generator for heat exchange with a heating medium in the generator, thereby heating the absorbent solution and separating refrigerant therefrom, wherein the improvement comprises controlling the refrigeration capacity of the system by (A) sensing a temperature functionally related to the temperature of the cooling medium passing in heat exchange relation with the absorbent solution in the absorber; and (B) diluting absorbent solution in the refrigeration system by opening a dilution passage and mixing liquid refrigerant with said absorbent solution upon sensing of a cooling medium temperature below a predetermined temperature during operation of the refrigeration system, thereby reducing the concentration of absorbent solution in said system under conditions of cooling medium temperature below said predetermined temperature.

8. A method of producing refrigeration as defined in claim 7 including the steps of collecting liquid refrigerant in a refrigerant sump; sensing the level of liquid refrigerant in said refrigerant sump; and performing the step of diluting absorbent solution during operation of the system, when the sensed level of liquid refrigerant in the refrigerant sump exceeds a predetermined first level thereof, in addition to said sensed temperature being below said predetermined temperature.

9. A method of producing refrigeration as defined in claim 8 including the steps of sensing a level of liquid refrigerant in said refrigerant sump above a second level thereof, said second level being higher than said first level; and mixing liquid refrigerant and absorbent solution upon the occurrence at and time during operation of said system of a refrigerant liquid level in excess of said second level so that said system operates at all times at a dilution corresponding to a refrigerant liquid level in said refrigerant sump between said first and second predetermined levels depending on the temperature of cooling medium supplied to the absorber.

References Cited

UNITED STATES PATENTS 2,855,765 10/1958 Smith et al. _____ 62—485
3,314,246 4/1967 Hopkins et al. _____ 62—494

LLOYD L. KING, *Primary Examiner.*

U.S. Cl. X.R.

62—147, 494